United States Patent [19]

Zacharkow et al.

[11] Patent Number: 4,460,465

[45] Date of Patent: Jul. 17, 1984

[54] FILTER/DEMINERALIZER UNIT

[75] Inventors: Stanley W. Zacharkow, Roebling; William D. Morgan, Cinnaminson, both of N.J.

[73] Assignee: Transamerica DeLaval, Inc., Princeton, N.J.

[21] Appl. No.: 544,834

[22] Filed: Oct. 24, 1983

[51] Int. Cl.³ ............................................. B01D 23/10
[52] U.S. Cl. ..................................... 210/266; 210/268
[58] Field of Search ................ 210/663, 189, 256, 259, 210/261, 266, 268, 282, 288, 315, 436, 472

[56] References Cited

U.S. PATENT DOCUMENTS 3,220,552 11/1965 Staats .................................... 210/256
3,715,035 2/1973 Teeple et al. ......................... 210/284
4,289,617 9/1981 Davis .................................... 210/256

Primary Examiner—Ivars C. Cintins
Attorney, Agent, or Firm—Hopgood, Calimafde, Kalil, Blaustein & Judlowe

[57] ABSTRACT

The invention contemplates a self-contained unit wherein a continuous flow of contaminated liquid, such as steam-plant condensate recycled as feedwater, may be processed on an on-line basis through a replaceable demineralizing resin bed and through a replaceable filter cartridge. The disclosed configuration incorporates two cylindrical chambers within a single housing. Flow for demineralizing purposes is directed downwardly through the resin bed in the space between chambers, and the thus-demineralized flow is then directed upward through the filter cartridge in the inner chamber.

11 Claims, 4 Drawing Figures

FILTER/DEMINERALIZER UNIT

BACKGROUND OF THE INVENTION

The invention relates to the cleaning of liquid effluent from industrial operations and in particular to the processing of hot cleaning and demineralizing of condensate as the same develops from steam generation and turbine operation in a modern steam system using a closed cycle of condensate recovery for re-supply as feedwater.

In conventional steam-system operations of the character indicated, filter functions are performed in apparatus separate and apart from demineralizing functions. And each of these different on-line devices must have its own multiple connections which also require separate assignment of plant space. Furthermore, all walls and connections for these separate devices must be designed to withstand maximum pressure differentials, i.e., the difference between line pressure, typically in the order of 100 psi and greater, and ambient atmospheric pressure.

BRIEF STATEMENT OF THE INVENTION

It is an object of the invention to provide improved liquid-processing means of the character indicated.

It is a specific object to provide apparatus having both demineralizing and filtering capabilities in a single unit and operative upon a single on-line flow of liquid being processed.

Another specific object is to meet the above objects with apparatus providing for independent servicing of the involved demineralizing function, apart from independent servicing of the involved filtering function.

It is a general object to meet the above objects with apparatus representing substantial savings in weight and plant-space requirements, as compared with the existing practice of using separate units for these functions.

The invention achieves the above objects in a single housing which is cylindrical and which contains a second and smaller cylinder, so as to provide for the demineralizing function in the annular space between cylinders, and for the filtering function within the smaller cylinder. A single flow of liquid to be processed is directed downward through a deep bed of beads of demineralizing resin, in the outer annular space. After screening at the bottom end of the smaller cylinder, the then-demineralized flow is upward through filter-cartridge means in the small cylinder, with on-line discharge from the upper end of the small cylinder.

DETAILED DESCRIPTION

A preferred embodiment of the invention will be illustratively described, in conjunction with the accompanying drawings, in which.

Figure 1:
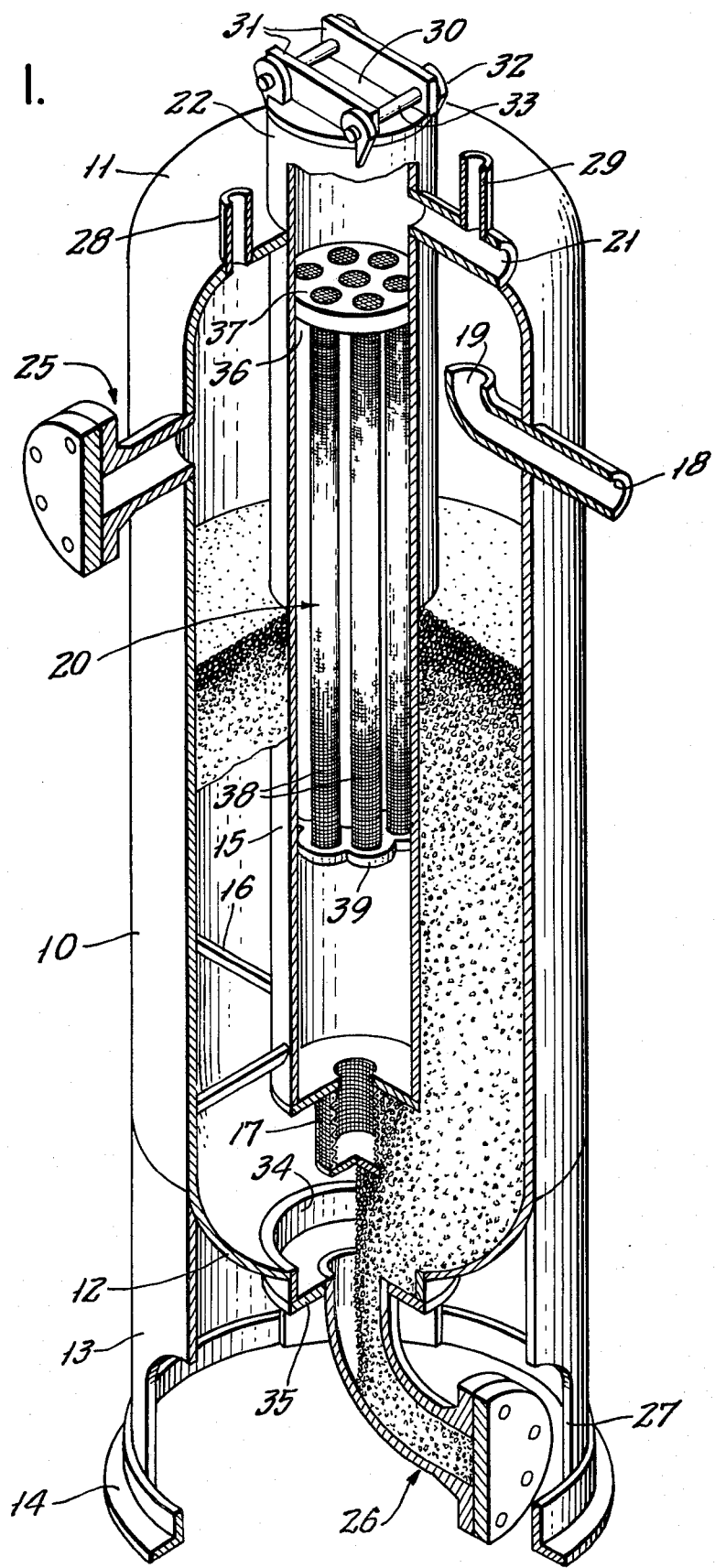
FIG. 1 is a simplified view in perspective of a filter/demineralizer unit of the invention, shown cutaway at a cylindrical sector, to reveal the internal relation of parts.
Figure 2:
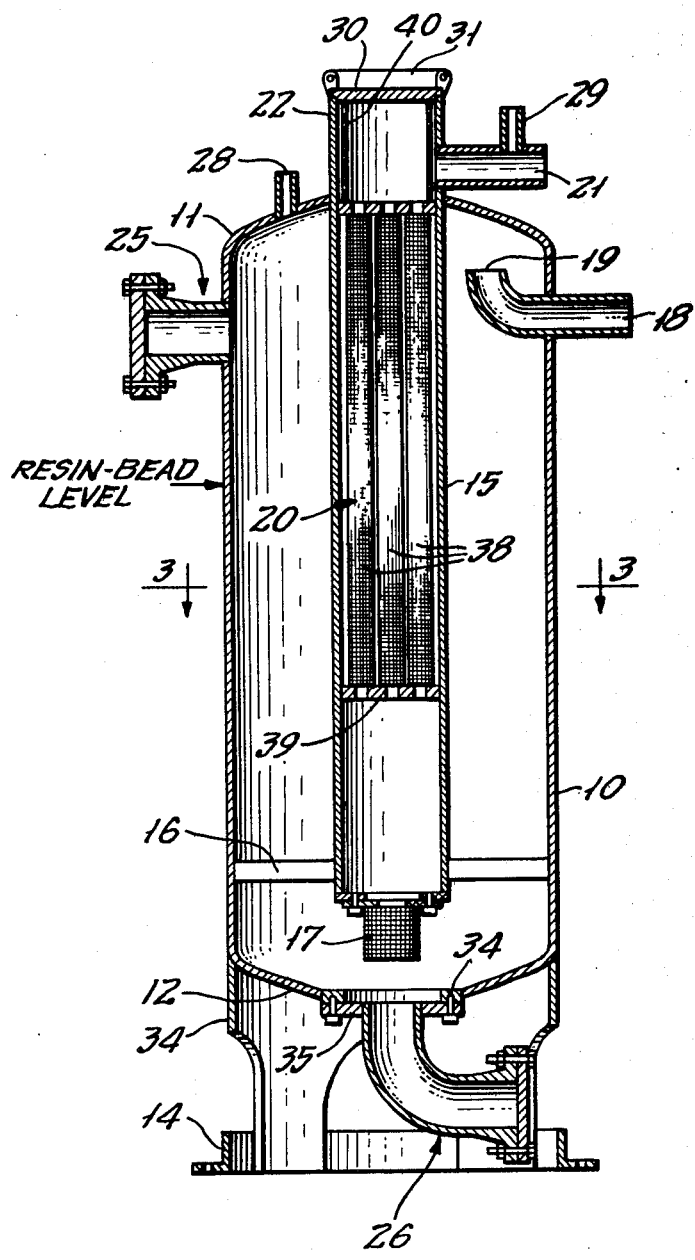
FIG. 2 is a vertical-section view of the unit of FIG. 1.
Figure 3:
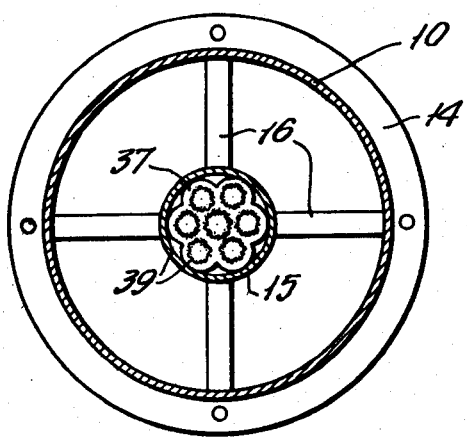
FIG. 3 is a sectional view taken at 3—3 in FIG. 2.

In FIGS. 1 and 2, the filter/demineralizer unit of the invention is seen to be contained within an upstanding outer cylindrical housing or tank 10 which has upper and lower end-bell closures 11-12, and which relies upon a cylindrical base shell 13 and flange 14 for floor-mounting. The upper end bell 11 is annular, and an elongate inner cylindrical shell 15 is secured to and depends from the central opening of end bell 11. In this suspension, the lower end of inner shell 15 approaches but is in vertically offset relation with the bottom closure 12 of housing 10, being preferably centrally stabilized as by radial struts or spider formations 16 which reference to the inner wall surface of housing 10.

A screen 17 carried at the bottom end of inner shell 15 functionally separates a demineralizing chamber (in the annular volume between cylinders 10-15) from a filter chamber (within the inner cylinder 15), and a single liquid flow through these chambers, in succession, is shown by directional arrows. This flow passes from an inlet connection 18, with upwardly directed discharge at 19 into the upper region of the demineralizing chamber, which will be understood to be filled with demineralizing-resin beads, to an upper-region level (shown by legend in FIG. 2), thus providing in the outer chamber a deep-bed resin filter for crud removal and for demineralization of water. The demineralized product is screened at 17 prior to upward central flow within inner shell 15, where further filtering is made through a miltiple-element filter-cartridge means 20 prior to discharge via an outlet connection 21, at a short and otherwise closed upwardly projecting end 22 of inner 15.

For loading and servicing of the resin bed, a normally closed upper sluice connection 25 is provided to the upper region of the outer chamber, at angular offset from the influent connection 18-19, and a normally closed lower sluice connection 26 includes an elbow, for direct horizontal access through an opening 27 in shell 13. A vent connection 28 to the upper end of the outer chamber and a vent connection 29 to the upper end of the inner chamber (via outlet 21) are shown open but will be understood to be usable with customary relief-value or other protective devices (not shown).

The inner chamber is shown detachably closed by a lid 30 having spaced flanges 31 which are apertured for alignment with pairs of lugs 32 at the upper end of shell extension 22, bolt (33) retention of the closure. At its lower end, the screen 17 is seen in FIG. 2 as a hub of wedgewire having a closed bottom-end wall and an upper flange which is removably bolted to an end flange of inner shell 15. Concentrically aligned beneath screen 17 is an access neck 34 forming part of the lower end bell 12, and it is to this neck 34 that the mounting flange 35 of the lower sluice connection 26 is removably bolted, to complete normal bottom-end closure of housing 10. The inside diameter of neck 34 will be understood to exceed that of any screen 17 or screen-mounting parts that may be used at the lower end of shell 15.

Within the inner shell 15, a circumferential shoulder 36 is shown formed in or secured to the inner wall of shell 15, for elevational location of an upper flange 37 forming part of the filter cartridge unit 20; preferably shoulder 36 is so positioned that the entire filter unit 20 is contained within housing 10, i.e., beneath the point of shell (15) suspension from end bell 11. Such a filter unit is commercially available from various sources, and for present purposes, we indicate suitability of the so-called disposable-cage cartridge filter manufactured under the mark FILTERITE, by Filterite Corporation of Timonium, Md. It suffices here to state that cartridge unit 20 comprises an upper panel which serves as the mounting flange 37 and which has a pattern of plural apertures through which a corresponding plurality of inner volumes of individual elongate filter cartridges 38 communicate. The lower ends of the individual cartridges 38 are closed and suitably spaced by a lower panel 39 which provides for flow access to the outside surfaces of all filter cartridges.

Figure 4:
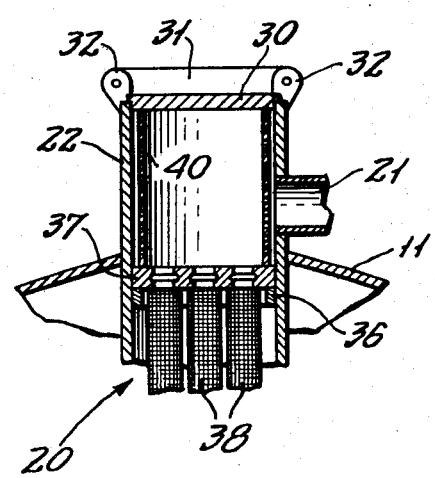
FIG. 4 is an enlarged fragmentary view in vertical section to show upper-end detail of FIG. 2.

Although not shown in the detail of FIG. 4, it will be understood that a suitable gasket or seal ring is preferably interposed between shoulder 36 and flange 37. And it is also preferred that axially stiff spacer means, such as a cylindrical shell 40 with large perforations be interposed between lid 30 and flange 37, to enable a secured lid 30 to drive flange 37 into sealed engagement with shoulder 36.

It will be seen that the described invention meets all stated objectives. The single unit performs all functions which have previously required two separate units. In the indicated condensate-recovery environment, the unit provides a deep-bed resin filter, with all conveniences of independent access for loading and maintenance of resin, and it also provides a cartridge filter and internal-screen (17) connection with all conveniences of independent access for fast filter-cartridge replacement, when needed, to assure optimum protection of downstream plant components, i.e., protection from resin fines.

The construction in necessarily light-weight and compact, and it minimizes leakage, in that interconnecting joints are avoided, due to an integrally formed interconnected relation of the two chambers. It may be designed internally for maximum pressure differentials (in the order of 2 psi) which are vastly more simple to accommodate than the 100 psi order of magnitude required of each of the separate prior devices.

While the invention has been described in detail for a preferred embodiment, it wll be understood that modifications may be made without departure from the scope of the invention.

What is claimed is:

1. A self-contained filter/demineralizer unit for on-line processing of a flow of contaminated liquid, comprising an upstanding outer cylindrical tank with top and bottom end closures; said top closure including an elongate cylindrical inner casing in radially spaced relation within said tank, an annular wall closing the annular space between said tank and casing and suspending the casing to an extent approaching but short of the bottom closure of said tank, there being a portion of said casing projecting upwardly beyond said top closure, and means including a screen closing the lower end of said casing; and inlet-flow connection to the upper region of said tank, and an outlet-flow connection to that portion of the casing which projects beyond said top closure; resin-maintenance means including a selectively openable sluice connection to the upper region of said tank and a selectively openable sluice connection to the bottom closure of said tank, a replaceable resin bed in the annulus between said casing and said tank for demineralizing downward flow from said inlet connection to the bottom of said casing; a removable closure for the upper end of said casing, and means removably suspending a replaceable filter cartridge in sealed relation with the inner surface of said casing, whereby upward flow of demineralized liquid in said casing may be subjected to filtration prior to discharge via said outlet-flow connection.

2. The filter/demineralizer unit of claim 1, in which said inlet-flow connection and said upper sluice connection are separate connections at angularly spaced locations in the upper region of said tank.

3. The filter/demineralizer unit of claim 1, in which radial spacer struts extend between the lower end of said casing and the inner surface of said tank in the lower region of said tank.

4. The filter/demineralizer unit of claim 1, in which said screen is detachably secured at the bottom end of said casing, and in which the sluice connection to the bottom closure of said tank is characterized by selective closure of a bottom-end opening of sufficient size to permit bottom-end servicing access to said screen.

5. The filter/demineralizer unit of claim 1, in which the inlet-flow connection includes an upwardly directed discharge end within said tank at an elevation above said upper sluice connection, whereby a circumferentially continuous layer of liquid to be processed may be developed above a resin bed maintained via said sluice connections.

6. The filter/demineralizer unit of claim 1, in which vent means is provided in the annular wall of the top closure of said tank.

7. The filter/demineralizer unit of claim 1, in which vent means is provided in said outlet-flow connection.

8. The filter/demineralizer unit of claim 4, in which said screen includes an elongate cylinder of screen material projecting downwardly into the space between bottom ends of said casing and of said tank.

9. The filter/demineralizer unit of claim 1, in which the means which removably suspends the filter cartridge includes a radially inward shoulder formation circumferentially continuous with the inner wall surface of said casing and at a location at or below the elevation of annular-wall suspension os said casing, whereby a filter cartridge having an upper-end seal and suspension flange may removably seal and locate against said shoulder formation, with all filtration action contained within said tank.

10. The filter/demineralizer unit of claim 9, in which the removable closure for the upper end of said casing includes means extending into said casing and adapted to engage and retain an inserted filter cartridge against said shoulder formation.

11. A self-contained filter/demineralizer unit for on-line processing of a flow of contaminated liquid, comprising an upstanding outer cylindrical tank with top and bottom end closures; said top closure including an elongate cylindrical inner casing in radially spaced relation within said tank, an annular wall closing the annular space between said tank and casing and suspending the casing to an extent approaching but short of the bottom closure of said tank, and means including a screen closing the lower end of said casing; an inlet-flow connection to the upper region of said tank, and an outlet-flow connection to the upper end region of said casing; resin-maintenance means including a selectively openable sluice connection to the upper region of said tank and a selectively openable sluice connection to the bottom closure of said tank, a replaceable resin bed in the annulus between said casing and said tank for demineralizing downward flow from said inlet connection to the bottom of said casing; a removable closure for the upper end of said casing, and means removably suspending a replaceable filter cartridge in sealed relation with the inner surface of said casing, whereby upward flow of demineralized liquid in said casing may be subjected to filtration prior to discharge via said outlet-flow connection.

* * * * *